(12) United States Patent
Hawk

(10) Patent No.: US 8,578,884 B2
(45) Date of Patent: Nov. 12, 2013

(54) ILLUMINATED DRINKING SYSTEM

(76) Inventor: John M Hawk, Harrison, TN (US)

( * ) Notice: Subject to any disclaimer, the term of this patent is extended or adjusted under 35 U.S.C. 154(b) by 729 days.

(21) Appl. No.: 12/700,244

(22) Filed: Feb. 4, 2010

(65) Prior Publication Data

US 2010/0192865 A1 Aug. 5, 2010

Related U.S. Application Data

(63) Continuation-in-part of application No. 11/458,814, filed on Jul. 20, 2006, now abandoned.

(51) Int. Cl.
*A01K 7/00* (2006.01)
*F21V 33/00* (2006.01)

(52) U.S. Cl.
USPC .......................................... 119/72; 362/253

(58) Field of Classification Search
USPC ......... 119/72, 72.5, 75, 71, 456, 457; 362/96, 362/101, 253; 239/17, 24, 279, 280, 285, 239/289, 566, 69
See application file for complete search history.

(56) References Cited

U.S. PATENT DOCUMENTS

| | | | |
|---|---|---|---|
| 2,457,159 A | 12/1948 | Kofford | |
| 2,468,729 A | 11/1949 | Beckley | |
| 2,678,026 A | 5/1954 | Rue et al. | |
| 2,973,743 A | 3/1961 | Parks et al. | |
| 3,322,101 A | 5/1967 | Eagles et al. | |
| 3,418,977 A | 12/1968 | Godshalk | |
| 4,373,471 A | 2/1983 | Coulbourn | |
| 4,416,221 A | 11/1983 | Novey | |
| 4,729,070 A * | 3/1988 | Chiu | 362/33 |
| 4,892,250 A * | 1/1990 | Fuller et al. | 239/18 |
| 4,901,922 A * | 2/1990 | Kessener et al. | 239/12 |
| 4,984,537 A | 1/1991 | Steudler, Jr. | |
| 5,193,485 A | 3/1993 | Hostetler | |
| 5,207,499 A | 5/1993 | Vajda et al. | |
| 5,873,647 A * | 2/1999 | Kurtz et al. | 362/96 |
| 6,058,881 A | 5/2000 | Thompson | |
| 6,076,741 A * | 6/2000 | Dandrel et al. | 239/18 |
| 6,308,657 B1 | 10/2001 | Schumacher et al. | |
| 6,484,952 B2 * | 11/2002 | Koren | 239/18 |
| 6,513,962 B1 * | 2/2003 | Mayshack et al. | 362/583 |
| 6,637,676 B2 * | 10/2003 | Zieger et al. | 239/548 |
| 7,008,073 B2 * | 3/2006 | Stuhlmacher, II | 362/96 |
| 7,303,299 B2 * | 12/2007 | Theus | 362/96 |
| 7,303,301 B2 * | 12/2007 | Koren et al. | 362/101 |
| 7,392,552 B2 * | 7/2008 | Lu | 4/675 |
| 7,422,342 B2 * | 9/2008 | Nanni et al. | 362/96 |
| 7,445,352 B2 * | 11/2008 | Lin | 362/101 |
| 7,513,621 B2 * | 4/2009 | Nevyas et al. | 351/221 |
| 7,823,801 B2 * | 11/2010 | McGarry et al. | 239/18 |
| 2002/0131265 A1 * | 9/2002 | Cilia | 362/101 |
| 2002/0158153 A1 * | 10/2002 | Zieger et al. | 239/548 |
| 2003/0063460 A1 | 4/2003 | Nadel | |

(Continued)

FOREIGN PATENT DOCUMENTS

KR 2005063377 A 6/2005

*Primary Examiner* — Joseph W Sanderson
(74) *Attorney, Agent, or Firm* — Laurence P. Colton; Smith Risley Tempel Santos LLC

(57) ABSTRACT

An improved drinking system having a water source capable of delivering water through water supply pipes, watering stations fluidly connected to the water supply pipes, and at least one light source optically connected to at least one of the watering stations. Also provided is a method for selectively distributing water to animals within a farm facility utilizing illuminated watering stations.

9 Claims, 14 Drawing Sheets

(56) References Cited

U.S. PATENT DOCUMENTS

| | | |
|---|---|---|
| 2003/0145797 A1 | 8/2003 | Crocker |
| 2005/0174537 A1* | 8/2005 | Nevyas et al. ............... 351/212 |
| 2006/0005776 A1 | 1/2006 | Williams |
| 2006/0077652 A1* | 4/2006 | Theus ............................ 362/96 |
| 2006/0112482 A1 | 6/2006 | Walker et al. |
| 2006/0288947 A1 | 12/2006 | Perlsweig et al. |
| 2007/0125307 A1 | 6/2007 | Nardine et al. |
| 2007/0221133 A1 | 9/2007 | Richmond |
| 2007/0295278 A1 | 12/2007 | Palett et al. |
| 2008/0035068 A1 | 2/2008 | Gou |
| 2009/0099587 A1* | 4/2009 | Nevyas et al. ............... 606/185 |

* cited by examiner

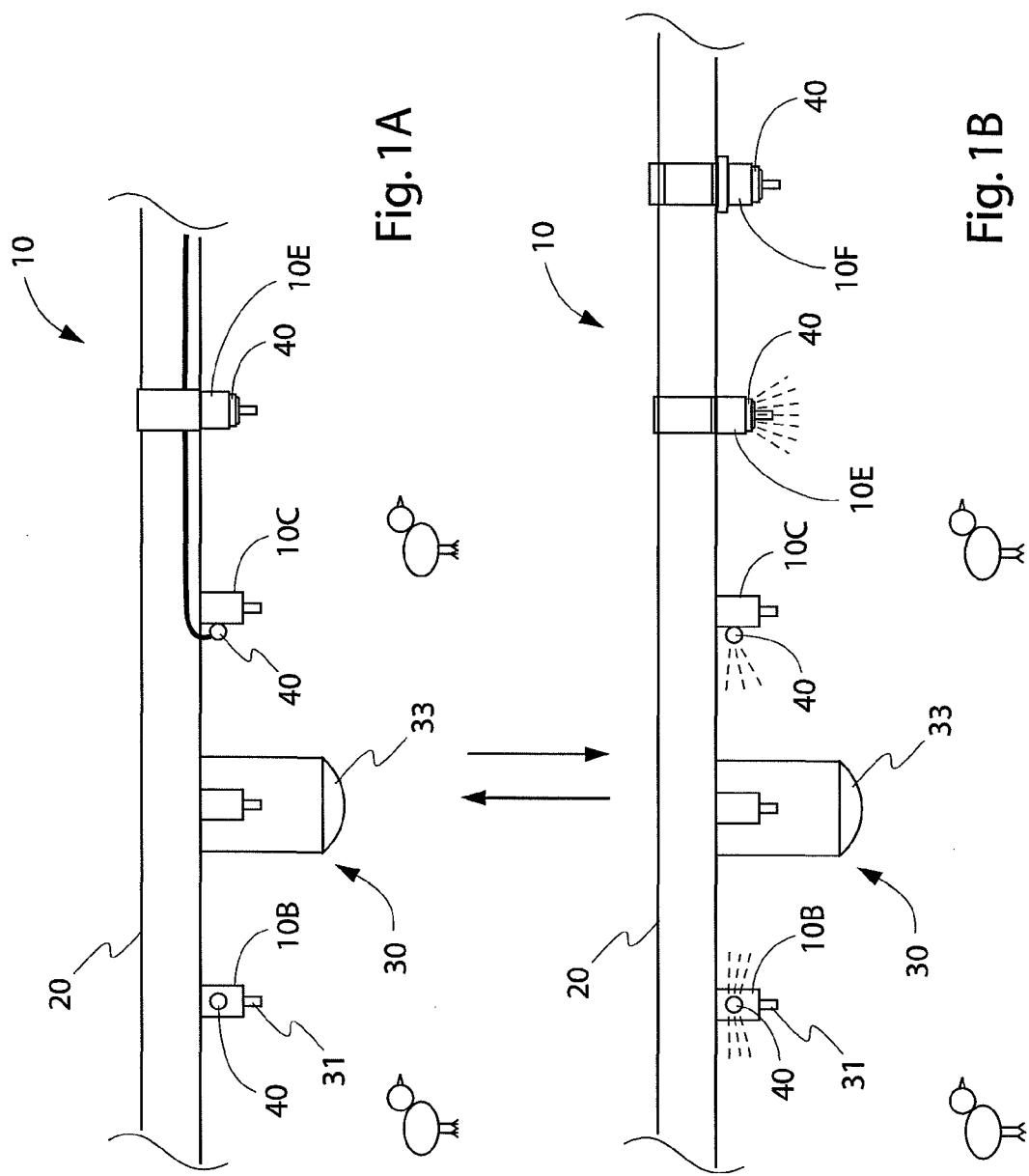

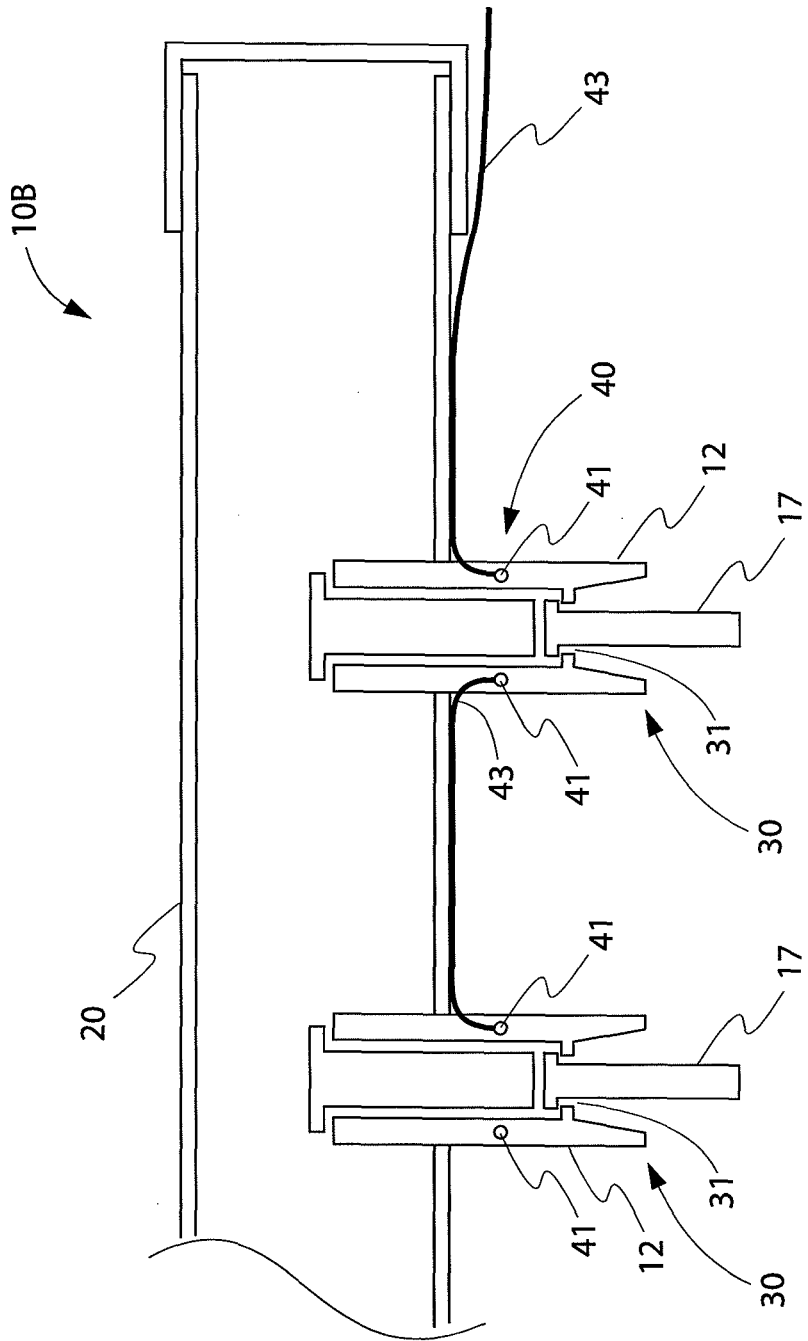

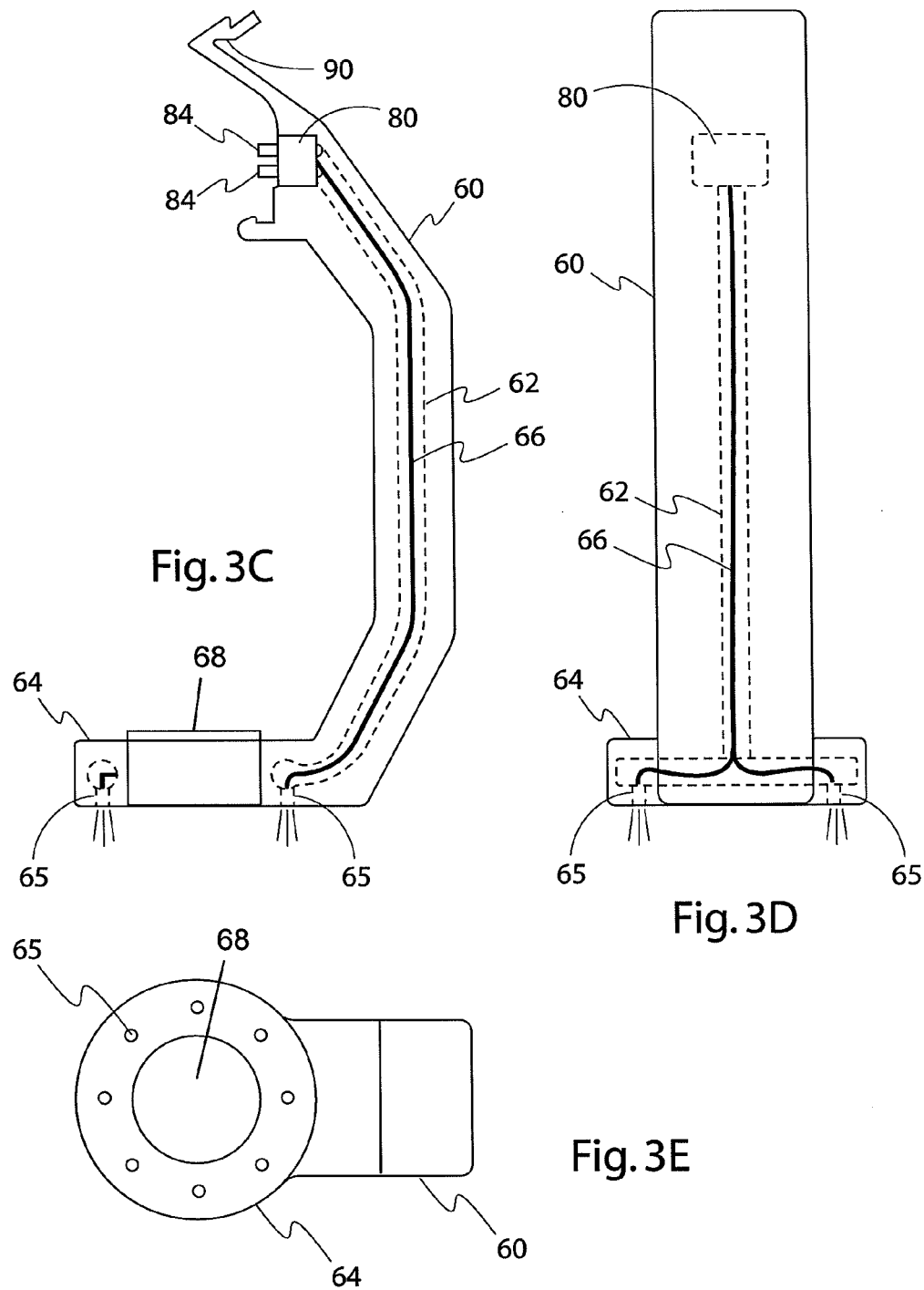

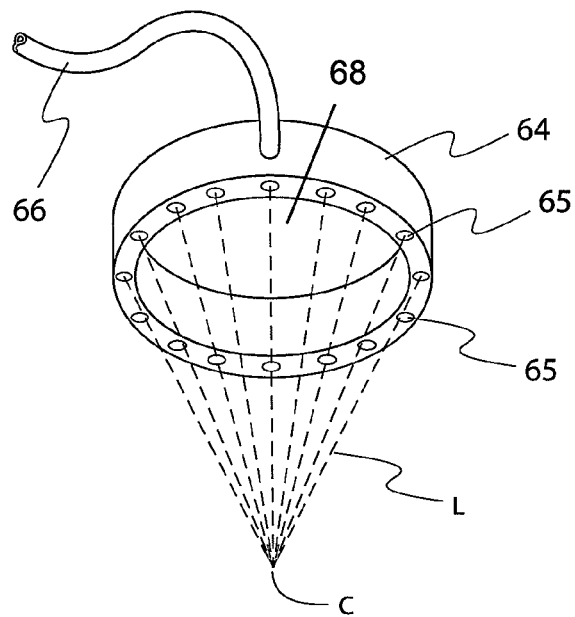
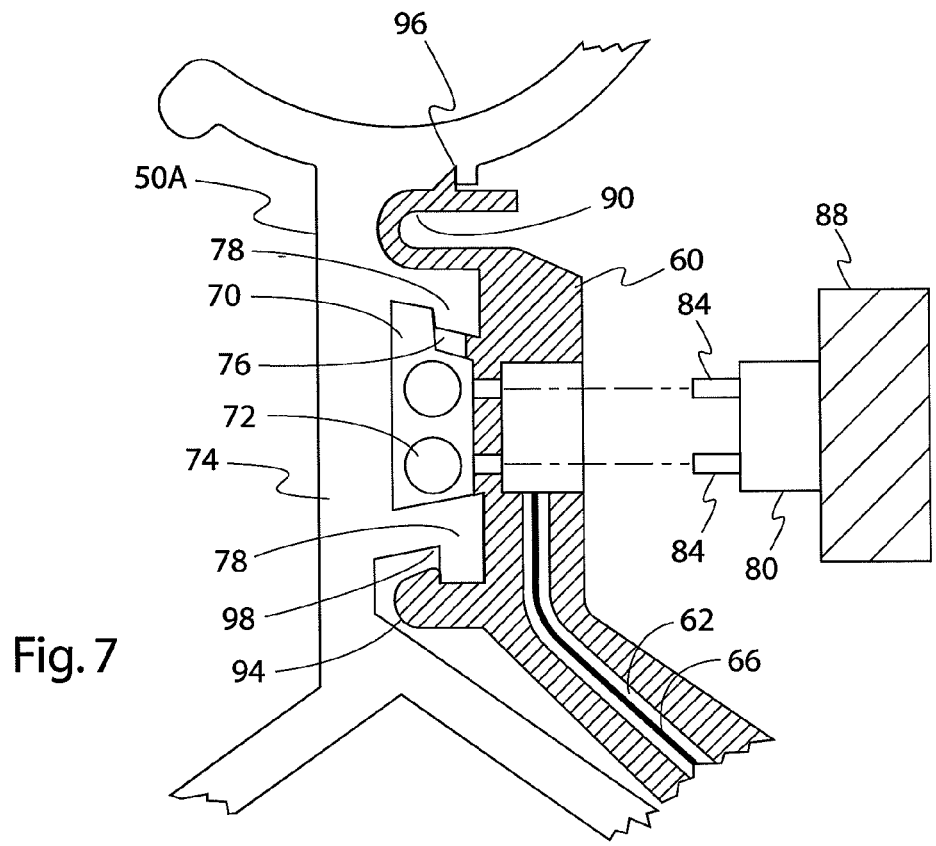

ILLUMINATED DRINKING SYSTEM

STATEMENT OF RELATED APPLICATIONS

This application is based on and is a continuation-in-part of U.S. patent application Ser. No. 11/458,814 having a filing date of 20 Jul. 2006, now abandoned which is incorporated herein in its entirety by this reference.

BACKGROUND OF THE INVENTION

1. Technical Field

This invention relates generally to improved drinking and feeding systems for animals, and to methods for increasing water consumption by animals. This invention relates more specifically to drinking systems for animal farm facilities, which drinking systems incorporate a light source to attract animals to, or allow animals to more easily find, the location of the drinking systems, in order to encourage water consumption and to promote more rapid growth of the animals.

2. Prior Art

Commercially raised animals of all types, such as for example poultry, cows and pigs, are a main food source for humans. For example, historically, poultry has been raised and processed on small family farms to be sold locally to buyers. However, as the human population increased, the demand for and per capita consumption of edible poultry has increased. As a result of the increased demand for poultry, the production of commercially raised poultry has evolved from small family farm operations to large totally integrated business operations devoted solely to the production of such animals.

To help ensure that animals in large farm facilities receive adequate water, commercial farm buildings typically have an array of water supply pipes. These water supply pipes typically have numerous watering stations, each having a nipple or cup drinker. For animals to drink from such a drinking system, the animals have to walk to the water stations and displace or engage a drinking valve, cup, or trough to allow water to flow. However, in many cases, the animals may not be able to find the watering stations as the typical commercial farm facility can be dark or lit with an improper or disadvantageous color of light. In such an environment, the animals often are unable to find the watering stations, particularly in darker areas of the farm facilities. As dehydration tends to increase mortality and morbidity rates, it is paramount that the animals in a flock or herd of commercially raised animals have access to, are stimulated properly to ingest, and receive the proper amount of water required for proper growth or increased production. Thus, the quantity of water ingested by an animal is directly related to the health of the animal and the quantity and quality of the meat derived from the animal.

Accordingly, there is always a need for an improved drinking system for use in poultry and other animal raising facilities. There also is a need for a drinking system having features that draw animals to the drinking system at selected or controlled times. There is a further need for a drinking system comprising a color of light for stimulation of the animals to drink the proper amount of water required for proper growth or increased production. Such a drinking system can help to reduce animal mortality rates and can increase the quantity and quality of animal meat available from a given flock or herd. It is to these needs, among others, that this invention is directed.

BRIEF SUMMARY OF THE INVENTION

Briefly, this invention is an improved drinking system for use in an animal raising farm facility and a method for increasing the quantity and/or quality of the meat derived from animals using the drinking system. In one illustrative form, the drinking system generally comprises water supply pipes and/or a plurality of watering stations capable of being illuminated by a light source, including different wavelengths of light. In addition to a light source, the drinking system can have many of the features of typical drinking systems such as structural supports, water supply pipes and components, drinking valves and catch cups. Providing the proper amount of water for an animal to grow or to increase the growth rate or final growth size can be desirable as water is the least expensive ingredient in animal production in obtaining a desired weight or weight range.

In a typical drinking system, watering stations are placed along and are in fluid connection with the water supply pipes. Each watering station typically has a drinking valve, often referred to as a nipple drinker due to the nipple structure many such drinking valves have, that extends downward from and is arranged serially along the water supply pipe. A valve shroud typically surrounds the drinking valve. Such drinking systems are well known in the art and have been disclosed and described elsewhere. Many, if not most, of the known drinking systems can be adapted to incorporate the present invention. Likewise, a new drinking system incorporating the present invention also can be constructed using different and alternative materials and components.

In preferred embodiments of the invention, a light source is provided to the drinking system to illuminate the watering station, or at least a portion of the watering station such as the drinking valve, and to provide preferred colors or wavelengths of light to the drinking valve and/or the catch cup such that at least one of these components is more clearly visible to the animals. In one general embodiment of the invention, optical fibers extend from the light source and terminate proximal to or within the valve shroud. The optical fibers can be attached to the water supply pipes or be supported in some other fashion. The light source can include light emitting diodes (LED) placed at or about the drinking stations, or within or on the valve shroud, with electric power lines running to the LEDs.

In a preferred embodiment of the invention, the light source is housed in a modular auxiliary clip that can be attached to the drinking system. LEDs for producing light and fiber-optic cables for directing the light on to the drinking valve are housed within the auxiliary clip, which can be adapted to fit onto various drinking system structures. The drinking system structure can be fitted or retrofitted with a power source such as a cooperating electrical outlet or connection for providing electrical power to the LEDs. For example, the electrical power energizes a circuit board containing the LEDs, which cooperate with the fiber-optic cables in directing light to illuminate at least a part of the watering station. The fiber-optic cables preferably terminate at the circuit board at a first end of the auxiliary clip and terminate at a second end proximal to the drinking valve of watering station such that the light from the LEDs is directed along the fiber-optic cables to the drinking valve, thus illuminating at least a portion of the drinking valve.

It is possible to activate and deactivate the light source such that the light for illuminating the watering stations can be in light mode or dark mode (on and off), or in different color mode (using different wavelengths of light that may be more attractive to the type of animal in the animal confinement facility). Overall, the drinking system comprises watering stations that are or can be illuminated, which has been found to draw animals towards the drinking system.

Another aspect of this invention is a method for selectively distributing water to animals within a farm facility comprising the steps of (a) providing at least one watering station capable of being illuminated by a light source, and (b) activating the light source so as to modify the behavior of the animals, including for example increased water consumption and growth, within a farm facility, whereby the activation of the light source causes the watering station to be illuminated thereby allowing the animals to be able to more easily find the watering station. Such an illustrative method can provide animal caretakers with more control over the drinking habits of their animals.

In operation and use, the drinking system can allow for the selective watering of animals. As individual animals are drawn to the watering stations by the light emanating therefrom, the actuation of the light source can be used to influence the water drinking patterns of animals. For example, the light source can be turned on or in light mode, in a colored light mode, or in a blink or strobe mode, for a longer period to encourage animals to drink from the watering stations. Alternatively, the light source can be turned off or in a dark mode to discourage the animal from drinking water. Thus, it is possible to influence the water drinking patterns of animals so to optimize the efficiency of the farm facility relative to the raising and growth of the animals. Further, the invention can be used to provide different colors of light during different stages of animal growth.

It is also possible to include a timer to regulate when the light source emanates light. In this arrangement, the drinking system may be set to illuminate at specific times or for specific lengths of time so as to draw the animals to the watering stations at specific times or for specific lengths of time. Alternatively, the drinking system can have a switch that allows the light source to be operated by the flow of water. In this arrangement, the switch can be a valve flap that allows the light source to be turned on and off in accordance with the water flow. Further, the drinking system can have a common on-off switching means, photocell switching means, or any other known or future developed switching means to turn the light source on and off.

The light source of the present invention may be any suitable light source that produces visible (to the animals) electromagnetic radiation. For example, such light sources can include light output transducers such as low voltage incandescent lamps, halogen and/or LEDs, series-connected or in parallel in the respective circuit. In some cases, it may be suitable to select or include an ultraviolet light because this type of light may be able to disinfect the water within the water supply pipes.

It is also contemplated that the animals can use the drinking system in a manner similar to any other drinking station. For example, once at the drinking valves, the animals peck or nudge against the exposed end of an actuator stem of the drinking valve causing the stem to be angularly displaced in a rocking relation from its closed relation relative to a pin in the drinking valve so that the pin is caused to be displaced upwardly, thereby releasing water. The extent of side displacement of the actuator stem will be generally correlated to the level of force imposed such that the smaller chicks will effect lesser displacement than will the larger more mature birds, with the result that less water will be released when less force is applied to the actuator stem and more water will be released when more force is applied to the actuator stem.

These features and other features and advantages of the present invention will become more apparent to those of ordinary skill in the relevant art when the following detailed description of the preferred embodiments is read in conjunction with the appended drawings in which like reference numerals designate like components throughout the several views.

BRIEF DESCRIPTION OF THE FIGURES

FIG. 1 is a front elevation view of a drinking system according to this invention illustrating alternative embodiments in a single drinking system.

FIG. 2A is a schematic front view of an embodiment of this invention showing an embedded LED light source.

FIG. 3C is a side elevation view of the preferred embodiment of this invention shown in FIG. 3A.

FIG. 3D is a front elevation view of the preferred embodiment of this invention shown in FIG. 3A.

FIG. 3E is a bottom view of the preferred embodiment of this invention shown in FIG. 3A.

FIG. 6 is a perspective view of an exemplary light ring with embedded fiber-optic cables suitable for use with the auxiliary clip shown in FIG. 3.

FIG. 7 is a detailed cross-sectional view of a portion of the watering station and the auxiliary clip suitable for use with the embodiment shown in FIG. 3.

DETAILED DESCRIPTION OF PREFERRED EMBODIMENTS

Illustrative embodiments of systems and methods according to the present invention are shown in FIGS. 1 through 13.

Although drinking system 10 is shown in the figures in connection with a chicken coop as the illustrative farm facility, it is understood that an embodiment of the drinking system 10 may be used in connection with any farm facility and with any type of commercially raised animal. The various types of animals that can be raised in such facilities include as non-limiting examples chickens, geese, ducks, turkeys, other poultry, hogs, cattle, other livestock, rabbits, guinea pigs, and the like. Further, embodiments of the drinking system 10 are suitable for use with floor drinking systems, cage drinking systems, and other drinking systems. While the invention is described herein in conjunction with the preferred embodiments, it will be understood that the invention is not limited to these embodiments.

Figure 2B:
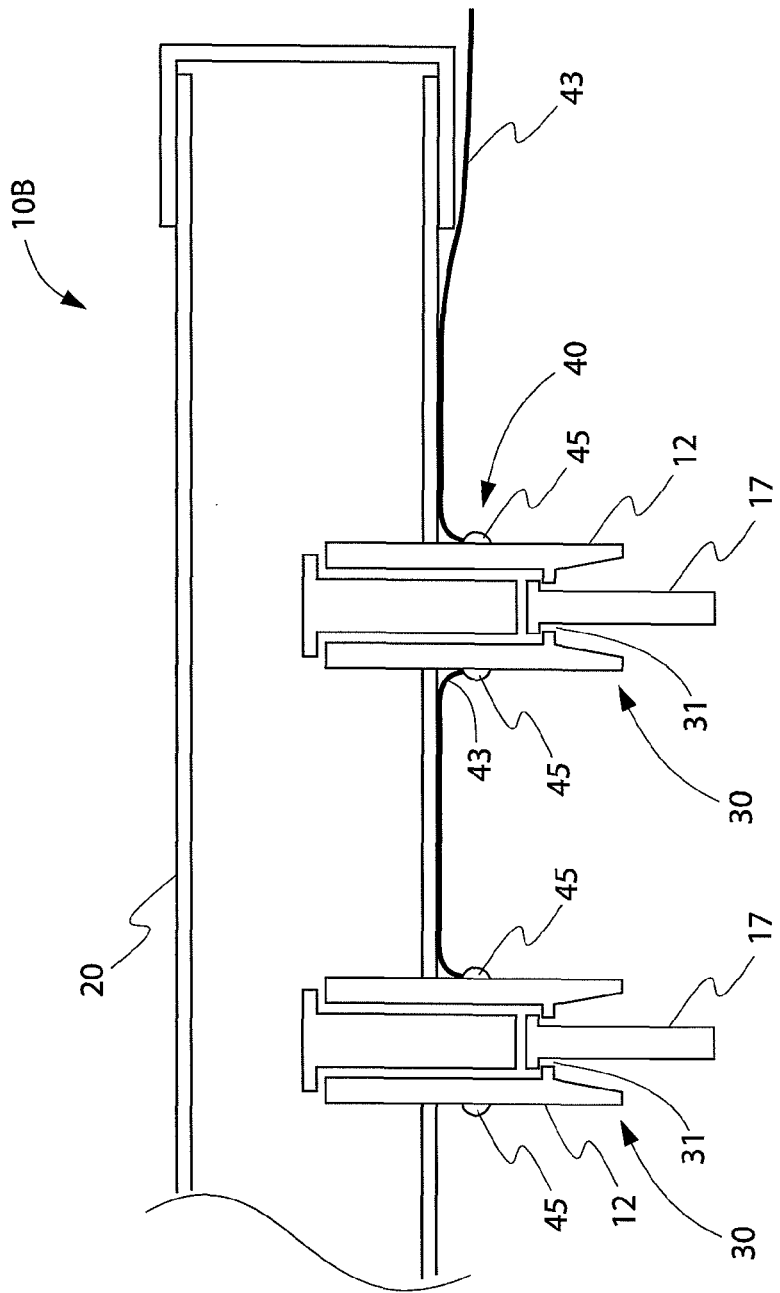
FIG. 2B is a schematic front view of an embodiment of this invention showing an external light bulb light source.

Referring now to the figures in general, the figures illustrate preferred embodiments of the invention in the best mode known to the inventor at this time. Specifically, FIG. 1 is a front elevation view of the drinking system 10 according to this invention showing the drinking system 10 alternating between light and dark modes or between different light color modes. FIG. 2A is a front schematic drawing of an exemplary embodiment of this invention showing a light source 40 proximal to watering stations 30 and represents the use of electric lines to illuminate a bulb, an LED, or the like embedded within a translucent valve shroud 12. FIG. 2B is a front schematic drawing of an exemplary embodiment of this invention showing the light source 40 proximal to the watering stations 30 and represents the use of electric lines to illuminate a bulb, an LED, or the like attached to the external surface of the valve shroud 12.

Figure 3A:
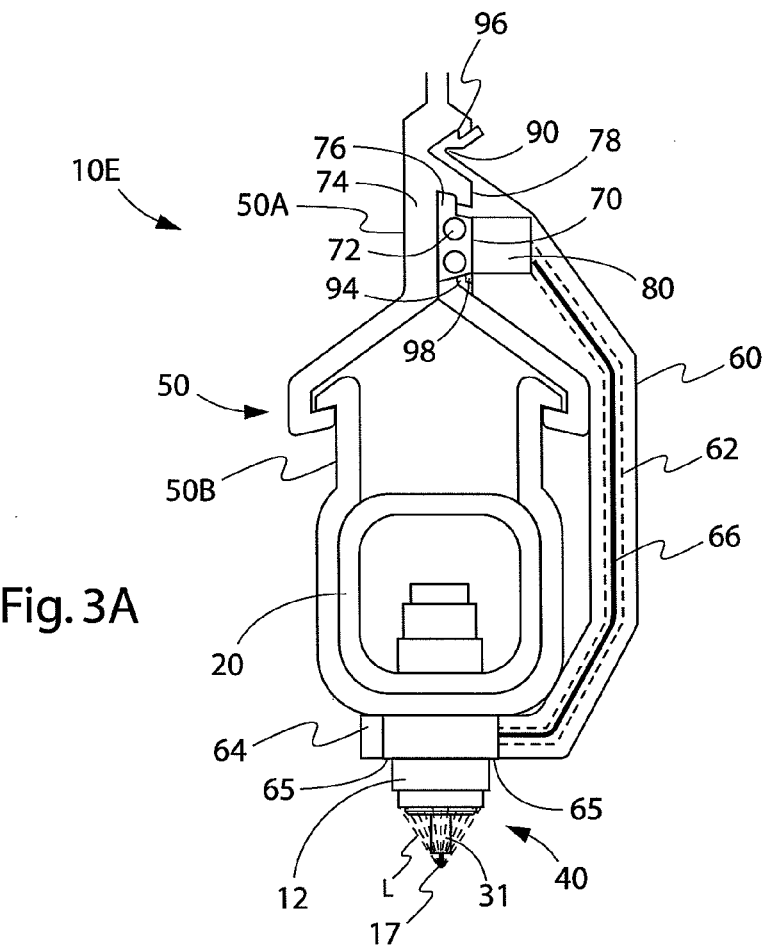
FIG. 3A is a cross-sectional side view of a preferred embodiment of this invention showing an exemplary watering station with an auxiliary clip having embedded fiber-optic cables.
Figure 3B:
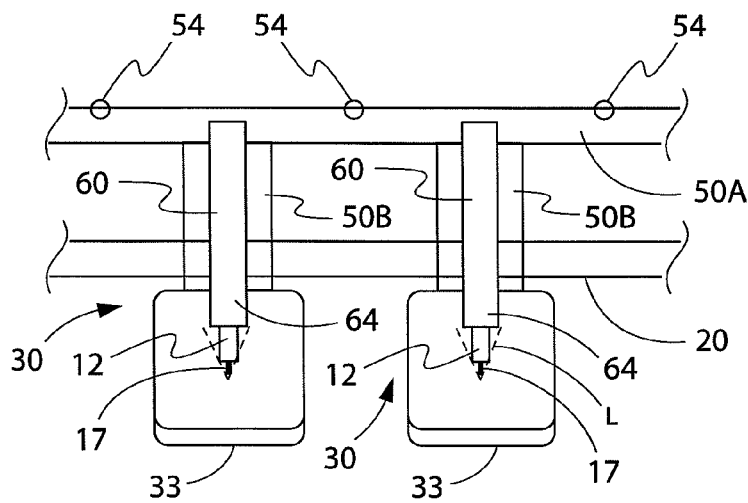
FIG. 3B is a front elevation view of the preferred embodiment of this invention shown in FIG. 3A attached to the drinking system.

FIG. 3A is a schematic cross-sectional side view of a preferred embodiment of this invention showing an exemplary watering station 30 with an auxiliary clip 60 having embedded fiber-optic cables. FIG. 3B is an exemplary front elevation view of the preferred embodiment of this invention shown in FIG. 3A attached to a drinking system and illustrating the placement of the invention relative to the watering stations 30. FIG. 3C is a side view of the auxiliary clip 60 shown in FIG. 3A illustrating various internal features and components, including the fiber-optic cable 66 within internal cable tunnel 62. FIG. 3D is a front view of the auxiliary clip 60 shown in FIG. 3A also illustrating various internal features and components shipped. FIG. 3E is a bottom plan view of the auxiliary clip 60 shown in FIG. 3A highlighting light ports 65 through which light projects.

Figure 4:
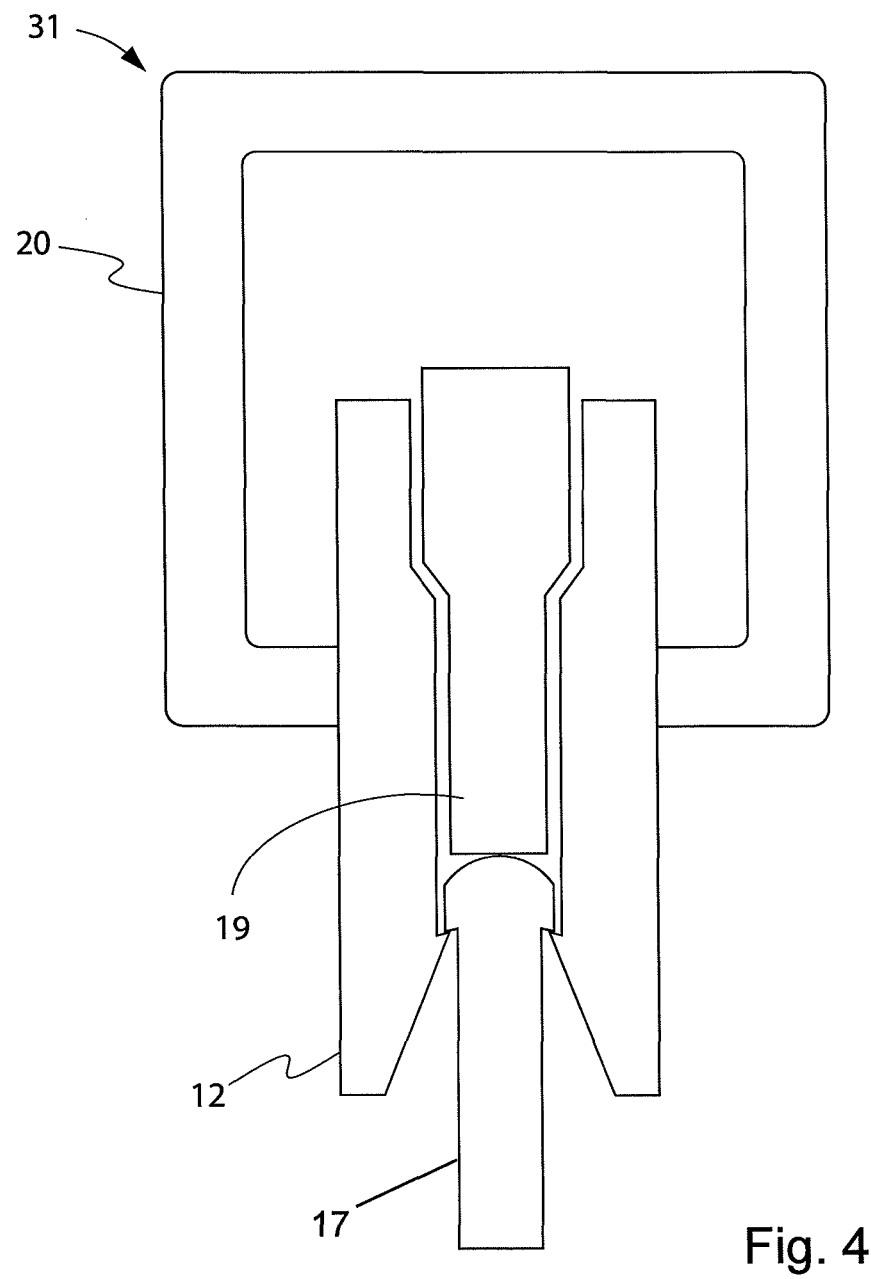
FIG. 4 is a side schematic view of an exemplary drinking valve suitable with the embodiment shown in FIG. 1
Figure 5:
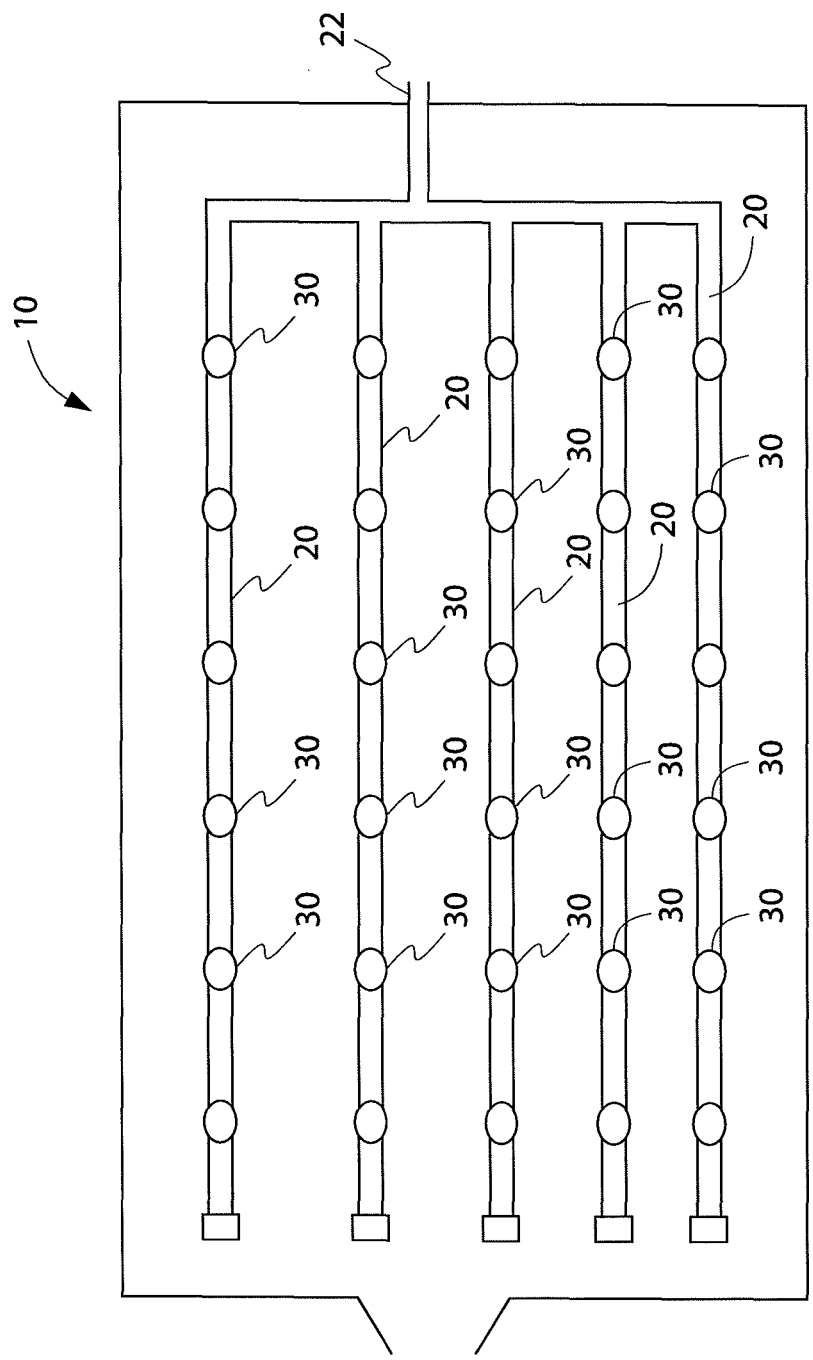
FIG. 5 is a top schematic view of the drinking system shown in FIG. 1 as installed in an exemplary animal raising facility.

FIG. 4 is an exemplary drinking valve 31, which can be an ordinary drinking valve, suitable with the drinking system 10 shown in FIG. 1. FIG. 5 is a schematic top view of the drinking system 10 shown in FIG. 1 in use in an exemplary farm facility. Further, it is contemplated that the invention can be scaled up or down both in size and in color light and/or intensity to handle larger or smaller animals, or different types of animals.

Figure 8:
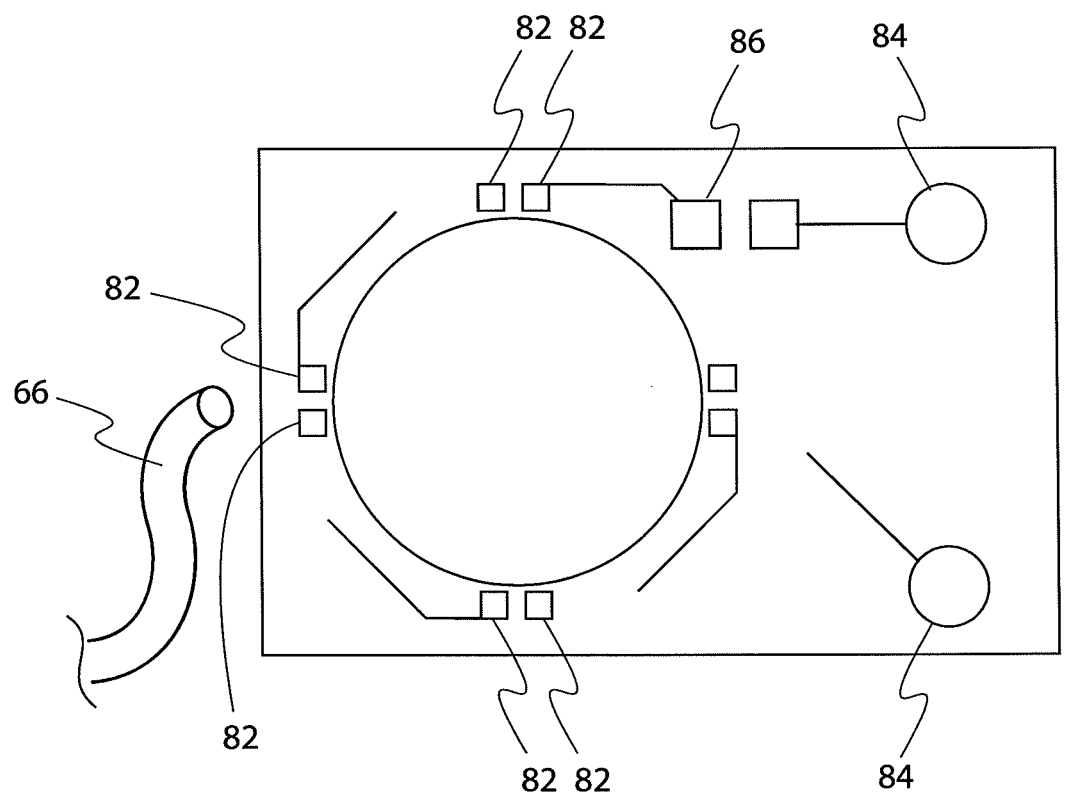
FIG. 8 is a schematic view of an exemplary circuit board suitable for use with the embodiment shown in FIG. 3.
Figure 9:
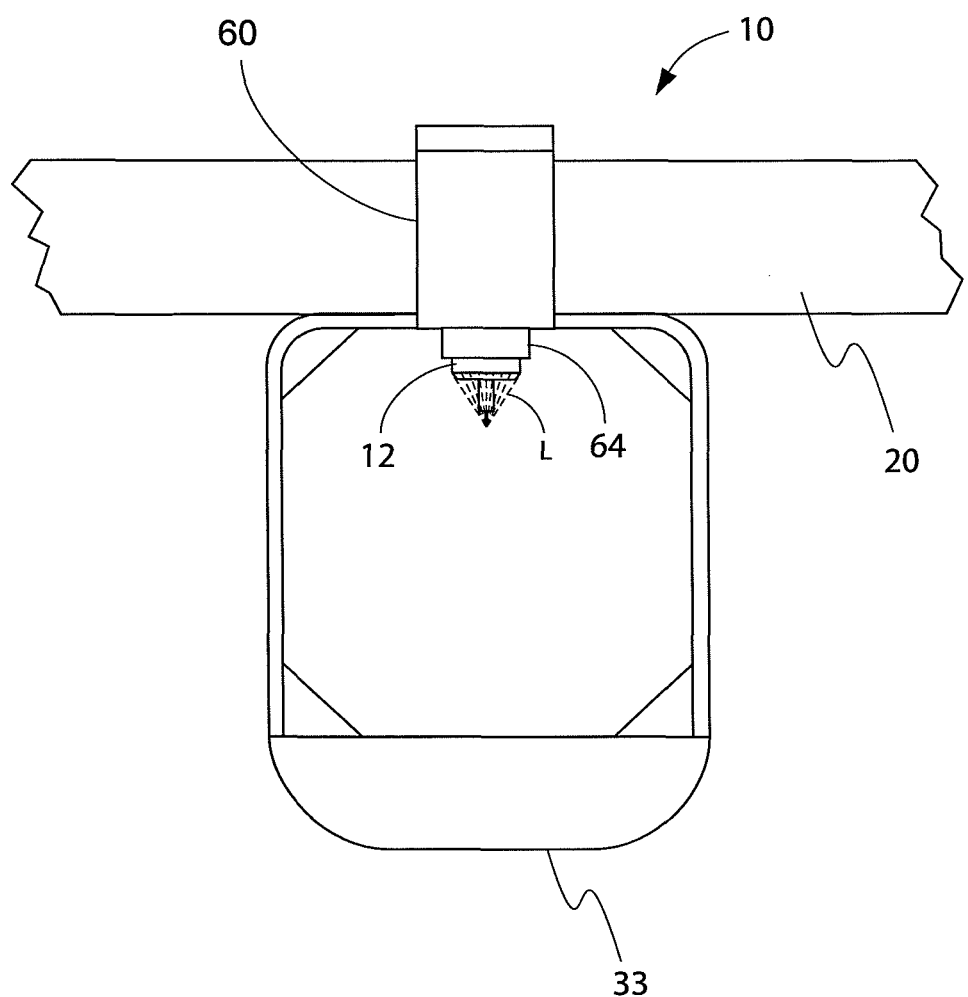
FIG. 9 is a front view of the watering station with a catch cup suitable for use with the embodiment shown in FIG. 3.

FIG. 6 is a perspective view of an exemplary light ring 64 with embedded fiber-optic cables 66 suitable with the embodiment shown in FIG. 3. The terminal ends of the fiber-optic cables 66 are spaced about the light ring 64 such that they emit light through ports 65 onto the drinking valve 31 when the fiber-optic cables 66 are transmitting light. FIG. 7 is a schematic cross-sectional view of an exemplary power outlet 70 and the auxiliary clip 60 also suitable with the embodiment shown in FIG. 3. The power outlet 70 can be powered either through internal or external wires, and couples with electrical prongs 84 contained on the auxiliary clip 60. FIG. 8 is a schematic view of an exemplary circuit board 80 suitable with the embodiment shown in FIG. 3, illustrating a suitable configuration of LEDs 82. FIG. 9 is a front view of the illustrative watering station 30 for the embodiment shown in FIG. 3, illustrating a light path L.

Figure 10A:
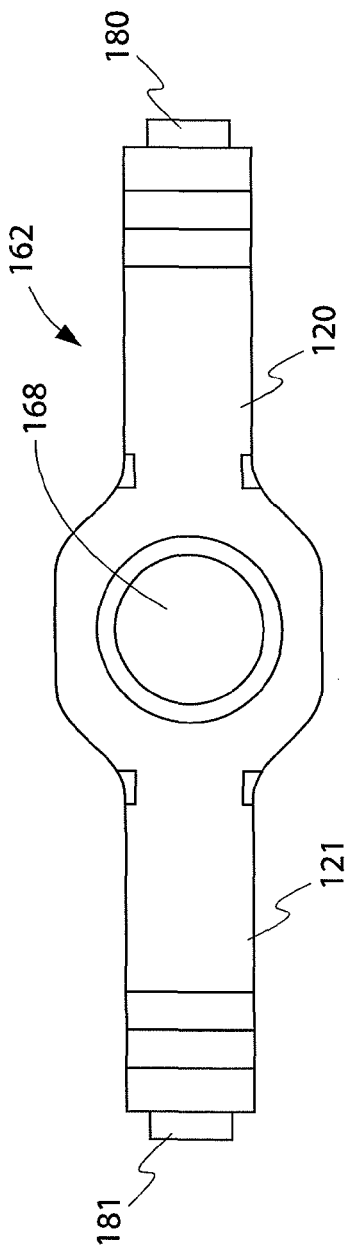
FIG. 10A is a top view of an alternative embodiment of an auxiliary clip prior to attachment to a drinking station and comprising a self-contained light ring of LEDs and fiber-optic cables.
Figure 10B:
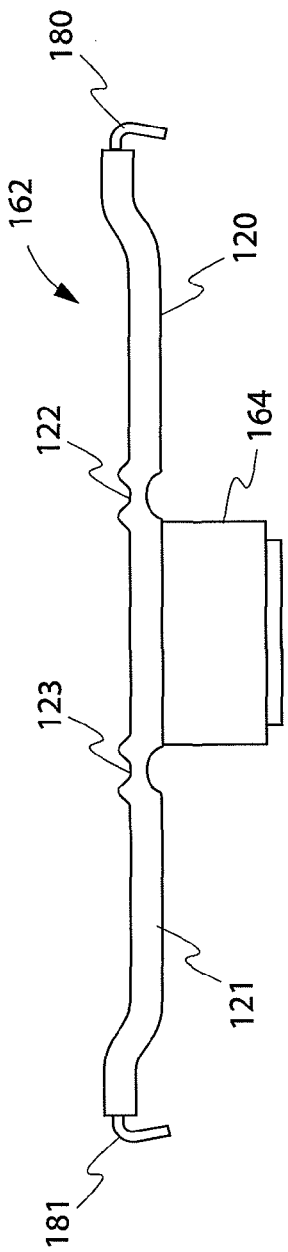
FIG. 10B is a side elevation view of the alternative embodiment of the auxiliary clip shown in FIG. 10A.
Figure 10C:
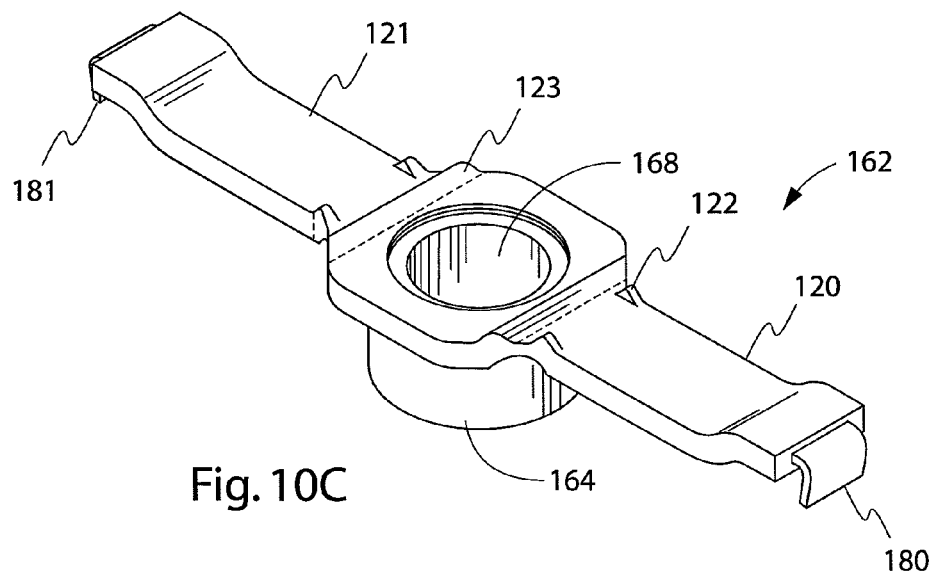
FIG. 10C is a perspective top view of the alternative embodiment of the auxiliary clip shown in FIG. 10A.
Figure 10D:
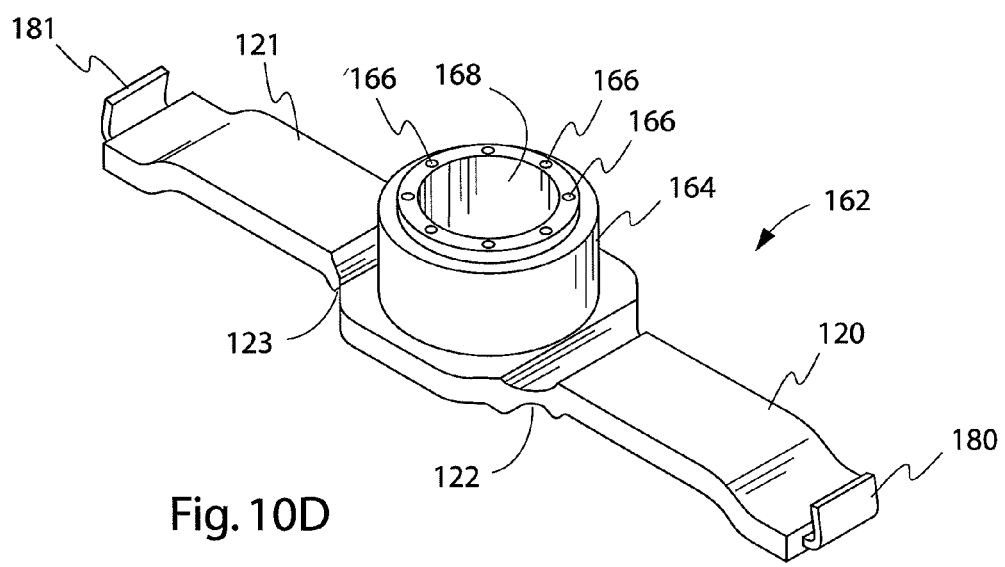
FIG. 10D is a perspective bottom view of the alternative embodiment of the auxiliary clip shown in FIG. 10A.
Figure 11A:
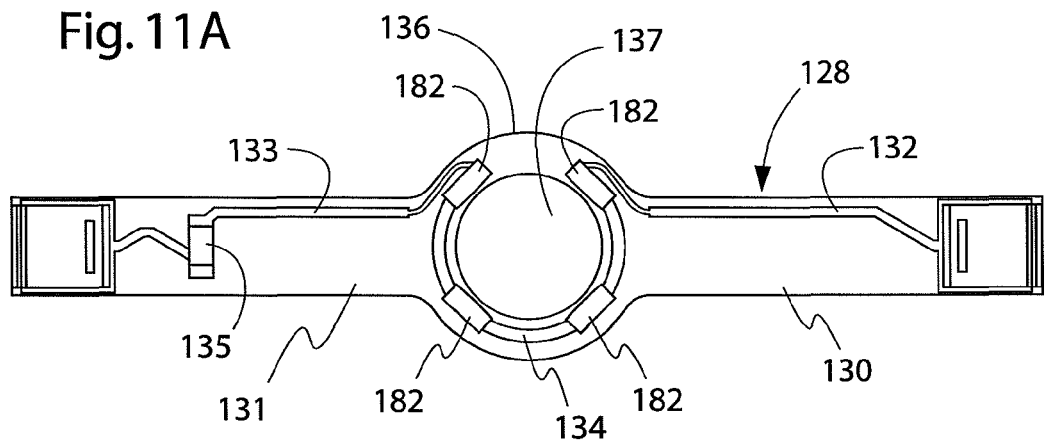
FIG. 11A is a bottom view of the internal circuitry of the auxiliary clip shown in FIG. 10A.
Figure 11B:
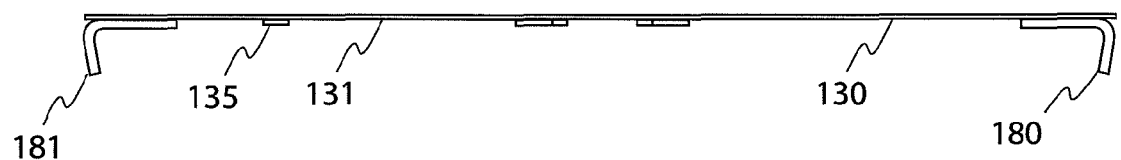
FIG. 11B is a side view of the internal circuitry shown in FIG. 11A.
Figure 11C:
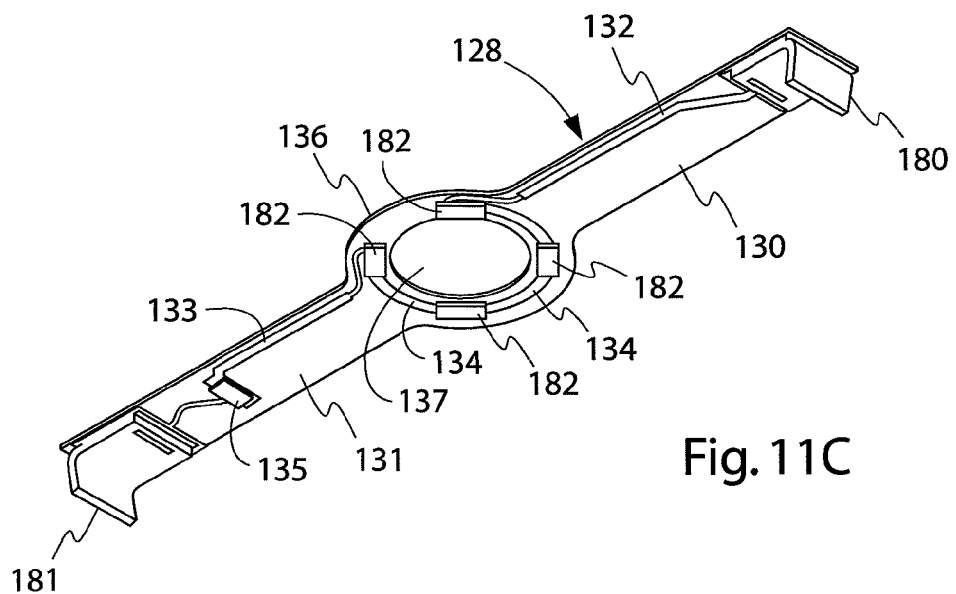
FIG. 11C is a perspective bottom view of the internal circuitry shown in FIG. 11A.
Figure 12:
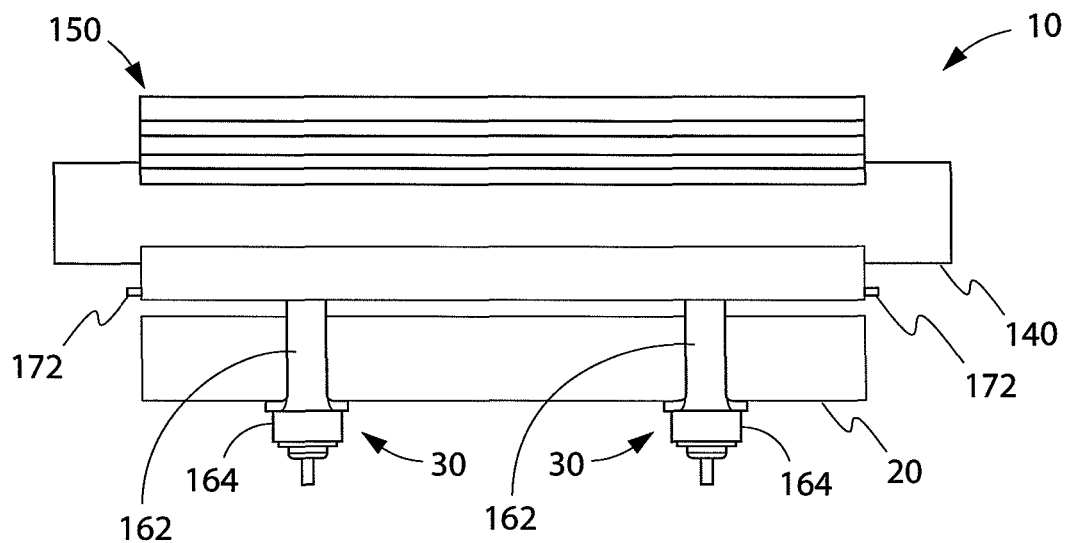
FIG. 12 is a side sectional view showing a preferred method of attaching the alternative embodiment shown in FIG. 10A to a suitable embodiment of a support rail for a drinking system.
Figure 13:
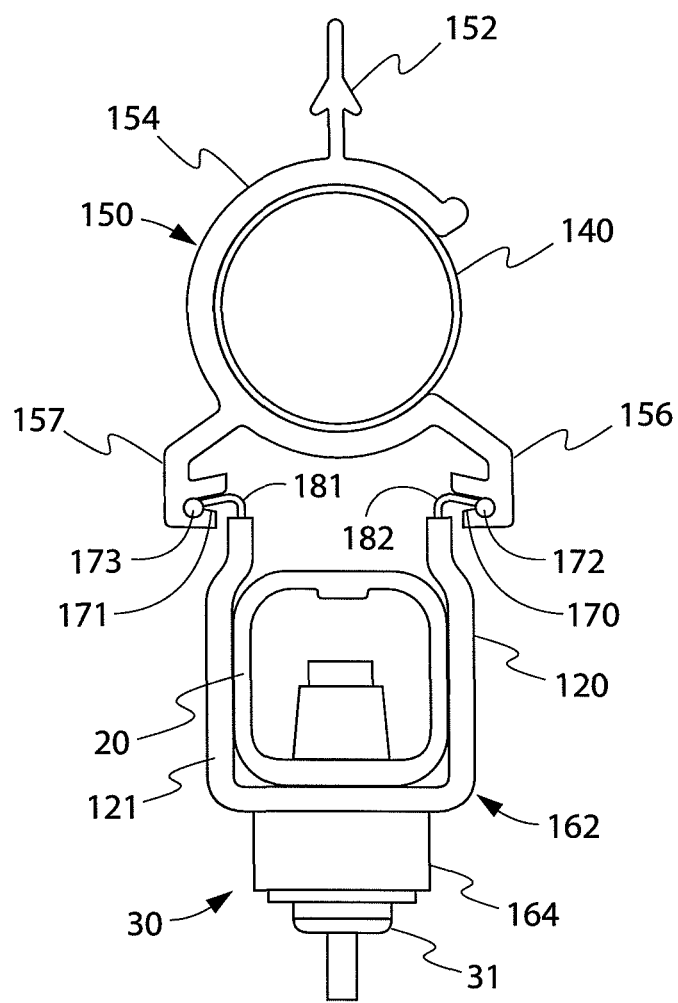
FIG. 13 is a front elevation view showing the general arrangement of the drinking system using the alternative embodiment shown in FIG. 10A.

FIG. 10A is a top view of an alternative embodiment of this invention structured as an auxiliary clip 162 with internal circuitry 128 (FIG. 11), prior to attachment to a watering station 30, and comprising a light ring 164 with fiber-optic cables 166. FIG. 10B is a side view of the auxiliary clip of 162 shown in FIG. 10A better illustrating live hinges 122 and 123 that allow this embodiment to be wrapped around the water supply pipes 20 and the watering station 30. FIG. 10C is a perspective top view of the auxiliary clip 162 shown in FIG. 10A, and FIG. 10D is a perspective bottom view of the auxiliary clip 162 shown in FIG. 10A. FIG. 11A is a bottom view of the internal circuitry 128 contained within the auxiliary clip 162 shown in FIG. 10A. FIG. 11B is a side view of the internal circuitry 128 shown in FIG. 11A, and FIG. 11C is a perspective bottom view of the internal circuitry 128 shown in FIG. 11A. FIG. 12 is a front view showing the general arrangement of the drinking system 10 using the auxiliary clip 162. FIG. 13 is a sectional view showing a preferred method of attaching the auxiliary clip 162 shown in FIG. 10A to a suitable embodiment of a powered or power-line-containing support rail 150 for a drinking system 10.

FIG. 1 illustrates a schematic side view of a generalized animal drinking system 10 for use in a farm facility. In its most basic form, drinking system 10 generally comprises water supply pipes 20 suspended from hangers 50 (see FIG. 3B) and a plurality of watering stations 30 each capable of being illuminated by a light source 40. In addition to light source 40, drinking system 10 can have many of the typical features such as a structural support, drinking valves 31, and catch cups 33. Drinking stations 30 are placed along water supply pipes 20 and are in fluid connection with water supply pipes 20. Drinking valves 31 extend downward and are arranged serially along the water supply pipe 20, and allow water within water supply pipe 20 to be supplied to the animals. In a typical embodiment, it is possible to activate and deactivate the light source 40 such that the light illumination status of watering stations 30 can be in light mode or dark mode. Overall, the drinking system 10 illuminates the watering stations 30, which has been found to draw animals towards the water stations 30.

FIG. 1 also shows several embodiments of the invention for illustrative purposes. One embodiment 10B, and as disclosed in more detail in conjunction with FIG. 2A, comprises an embedded diode light path. Another embodiment 100, and as disclosed in more detail in conjunction with FIG. 2B, comprises an external light bulb light path. Another embodiment 10E, and as disclosed in more detail in conjunction with FIGS. 3, 6, 7, 8 and 9, is a preferred embodiment and comprises an auxiliary clip 60 and an embedded fiber-optic cable light path. Another embodiment 10F, and as disclosed in more detail in conjunction with FIGS. 10 through 12, is an alternative preferred embodiment and comprises an illuminating auxiliary clip 162 with a light ring 164.

Although a bright white light is preferable, the light L can be any color desired. For example, if a certain animal sees one color better than another color, the light L can be the color the animal sees better. Additionally, an ultraviolet light also can be used because it can act as a disinfecting agent to the water, thus helping to increase the health of the animals drinking the water. Further, if the valve shroud 12 is white or contains white, an ultraviolet light can cause the valve shroud 12 to glow and be visible to the animals. One preferable color of light is a full spectrum light imitating sunlight. Light sources can be any known or future developed type of light, such as incandescent bulbs, fluorescent bulbs, noble gas bulbs, diodes, lasers, et cetera, but in a preferred embodiment are LEDs.

FIG. 2A illustrates an illustrative embodiment of the drinking system 10 for use in a farm facility. Drinking system 10 is a commonly available drinking system and can include water supply 22 (FIG. 5) connected to water supply pipes 20, a plurality of watering stations 30 connected to water supply pipes 20, and at least one light source 40 in optical connection with watering station 30. In the example shown in FIG. 2A, the light source 40 includes light emitting diode (LED) 41 placed at or about watering station 30. More specifically, LED 41 is embedded within valve shroud 12 and the emitted light L can pass through valve shroud 12 of drinking valve 31. LEDs 41 are connected to any suitable electricity supply via wires 43. Wires 43 can be attached to the outside of water supply pipes 20.

FIG. 2B illustrates one embodiment of drinking system 10 for use in a farm facility. Again, drinking system 10 is a commonly available drinking system 10 and can include a water supply 22 (FIG. 5) connected to water supply pipes 20, a plurality of watering stations 30 connected to water supply pipes 20, and at least one light source 40 in optical connection with watering station 30. In the example shown in FIG. 2B, the light source 40 includes a light bulb 45 placed at or about watering station 30. More specifically, light bulb 45 is attached to the outer surface of valve shroud 12, and the emitted light L merely shines from the surface of valve shroud 12 of drinking valve 31. Light bulbs 45 are connected to any suitable electricity supply via wires 43. The embodiment shown in FIG. 2B is slightly less invasive than the embodiment shown in FIG. 2A as it does not involve the use of light sources embedded in the valve shroud 12, but uses preferably external wires 43 to energize light bulbs 45. Optionally, light bulbs 45 can be replaced with LEDs 41. Wires 43 can be attached to the outside of water supply pipes 20 or on hangers 50. Also alternatively, light source 40 can be a fiber-optic cable or fiber connected to watering station 30 and having a terminating end proximal to drinking valve 31.

FIGS. 3A through 3E show an embodiment of a drinking system 10 for use in a farm facility comprising an illustrative preferred embodiment of the invention. Again, drinking system 10 is a commonly available drinking system and can include the water supply 22 (FIG. 5) connected to water supply pipes 20, a plurality of watering stations 30 connected to water supply pipes 20, and at least one light source 40 in optical connection with watering station 30. A typical drinking system 10 comprises hangers 50 suspended by wires 54 from the roof structure, or some other supporting structure, of the farm facility. Top hanger 50A often is an aluminum bar having an upside down "Y" cross-section, from which many bottom hangers 50B suspend. Bottom hangers 50B wrap around water supply pipes 20, typically at each point where watering stations 30 are located, so as to provide better support for water supply pipes 20. Drinking or catch cups 33 often are suspended below watering stations 30. Top hanger 50A provides the rigid support for suspending water supply pipes 20 and watering stations 30. The general structure of such drinking systems 10 is known and common in the art.

In the example shown in FIGS. 3A through 3E, the structure of the drinking system 10 is adapted to accommodate auxiliary clip 60, which comprises the basic components of the invention. Top hanger 50A comprises a first clip notch 96 for accommodating hinge 90, which is used to attach the auxiliary clip 60 to the top hanger 50A. The top hanger 50A also can comprise a second clip notch 98 for accommodating a secondary clip 94 (see FIG. 7) for added security in attaching auxiliary clip 60 to the top hanger 50A. The shape and dimensions of both clip notches 96, 98 and the outer sides of hinge 90 and secondary clip 94 can be designed by those of ordinary skill in the art without undue experimentation to allow a proper fit between auxiliary clip 60 and top hanger 50A. Top hanger 50A further can comprise a tunnel 76 for housing electrical wires 72 and other components for the invention. In typical top hanger 50A, the tunnel 76 is formed on a down strut 74 and angled walls 78, which also can be used as attachment points for auxiliary clip 60. Top hanger 50A can be extruded in the desired cross-section.

Top hanger 50A further comprises components for providing power to auxiliary clip 60 and therefore to a circuit board 80 and the light source 40. In the example shown in FIGS. 3A through 3D and 7, these components comprise electrical wires 72 attached to the outside of, or contained or embedded within tunnel 76, of top hanger 50A, and power outlets 70. Electrical wires 72 carry an appropriate electrical current for powering circuit boards 80. Power outlets 70 allow prongs 84 (see FIGS. 7 and 8) to electrically connect circuit board 80 (or any desired light source 40) to electrical wires 72. Power outlets 70 can be as simple as holes or ports giving access to electrical wires 72. In this preferred embodiment, auxiliary clip 60 attaches to the drinking system 10 on hanger 50A, 50B and cooperates with power outlet 70.

FIGS. 3C and 3D illustrate the exemplary auxiliary clip 60 structured to clip onto and cooperate with hanger 50A, 50B and drinking valve 31. With reference to FIGS. 3A, 3C, and 7, hinge 90 cooperates with top hanger 50A by snapping into clip notch 96, and secondary clip 94 snaps into second clip notch 98. A light ring 64 attached to the bottom of the auxiliary clip 60 cooperates with drinking valve 31 by fitting around valve shroud 12 between pipe 20 adjacent the lower side of bottom hanger 50B and the actuator stem 17 of drinking valve 31. The auxiliary clip 60 can be connected to the hanger 50A by the round hinge 90 (FIGS. 3A and 7) or by a square hinge (not shown). The auxiliary clip 60 is preferably of a material and dimensions to allow it to be wrapped about hanger 50A, 50B, such as a plastic or other polymer or metal.

Auxiliary clip 60 comprises an internal cable tunnel 62, or other equivalent cable passage or track, in which fiber-optic cables 66 are housed. Light ring 64 is joined to the lower end of auxiliary clip 60. Light ring 64 fits over drinking valve 31 and emits light L through light ports 65 from the terminal ends of the fiber-optic cables 66 to illuminate the drinking valve 31. Circuit board 80 comprising LEDs 82 is located in or snaps into and cooperates with the upper end of auxiliary clip 60 (see FIG. 7). More specifically, circuit board 80, or an equivalent light source 40, is a part of or snaps into the upper end of auxiliary clip 60 such that circuit board 80 can connect to electrical wires 72. Fiber-optic cables 66 attach to or otherwise cooperate with circuit board 80, and especially LEDs 82, and extend through cable tunnel 62 to light ring 64 so as to direct light emanating from LEDs, through the light ports 65, to drinking valve 31. Light ring 64 comprises at least one port 65 on the bottom side through which either the end of fiber-optic cable 66 can extend or through which light can project. Auxiliary clip 60 can be formed or molded with the appropriate cable tunnels 62, and such a design is within the knowledge of those of ordinary skill in the appropriate arts. When LEDs 82 are energized (FIG. 8), light travels through the fiber-optic cables 66, which run through the cable tunnel 62 inside auxiliary clip 60, and allows emitted light L to exit the terminal ends of the fiber-optic cables 66 embedded within light ring 64 and to illuminate the drinking valve 31 through light ports 65 (see FIG. 3E).

FIG. 4 schematically illustrates a representative drinking valve 31. Drinking valve 31 can be any of the commercially available drinking valve structures. In certain preferred embodiments, drinking valve 31 comprises a shroud 12 that can be made of a translucent or transparent material. FIG. 5 schematically illustrates a representative drinking system in a farm facility showing that the water supply pipes 20 and watering stations 30 can be located throughout the farm facility. These general devices are known in the art.

FIGS. 6 through 9 provide further detail of an embodiment of the mechanism used to illuminate the watering stations 30 via fiber-optic cables 66. FIG. 6 illustrates the terminal ends of fiber-optic cables 66, embedded within the light ring 64 which is located at a terminal end of the auxiliary clip 60. The terminal ends of the fiber-optic cables 66 emit light L through light ports 65 to illuminate the drinking valve 31. Light ring 64 can be any shape so as to cooperate with drinking valve 31. Further, fiber-optic cables 66 may be of any color or pattern so as to optimize the desired drinking behavior of an animal. Light L emitted from fiber-optic cables 66 can converge at a point corresponding to actuator stem 17 (FIG. 4). Light ring 64 has an inner circumference or opening 68 sized to cooperate with an outer circumference of the valve shroud 12 at the lower end of the watering station 30, and thus can be constructed of any suitable size to cooperate with the various different sizes of watering stations 30. Alternatively, if the inner circumference 68 of light ring 64 is of a sufficiently large size, it can cooperate with a number of different sized watering stations 30.

FIG. 7 shows in more detail the illustrative structure allowing the auxiliary clip 60 to be attached to the top hanger 50A of the drinking system 10. Top hanger 50A comprises clip notch 96 for accommodating hinge 90, which is used to attach auxiliary clip 60 to top hanger 50A. Top hanger 50A also can comprise a second clip notch 98 for accommodating a secondary clip 94 for added security in attaching auxiliary clip 60 to top hanger 50A. The shape and dimensions of both clip notches 96, 98 and the outer sides of hinge 90 and secondary clip 94 can be designed by those of ordinary skill in the art without undue experimentation to allow a proper fit between auxiliary clip 60 and top hanger 50A. Thus, light ring 64 of auxiliary clip 60 can be slipped over the watering station 30 and then hinge 90 can be inserted into clip notch 96 and secured. Secondary clip 94 can be inserted into second clip notch 98 for additional security. Because auxiliary clip 60 preferably is constructed out of a plastic, which is flexible, both hinge 90 and secondary clip 94 can flex or deform to fit into clip notch 96 and second clip notch 98, respectively.

FIG. 7 also shows an illustrative structure for supplying power to circuit board 80 when electrically conducting prongs 84 are connected to power outlet 70. In this embodiment, circuit board 80 is part of a plug-in module 88 separate from auxiliary clip 60. In other embodiments, circuit board 80 can be manufactured within auxiliary clip 60. In a preferred embodiment, one prong 84 is attached to a current limit resistor 86 to prevent or limit power surges. Cable tunnel 62 houses fiber-optic cables 66 that are optically connected to LEDs 82. Internal electrical wiring 72 is preferred, although external wires attached to the outside of the water supply pipes 20 or any other common electrical supply means can be utilized to energize the LEDs 82. It should be understood that the illustrated circuit board 80 only shows a preferred embodiment of the present invention where a simple circuit board 80 provides an LED light source 40 to the fiber-optic cables 66. Circuit board 80 can be modified to accommodate more complex circuits without changing the footprint to modify light intensity, color control commands, and intelligence. Auxiliary clip 60 can be removed from hangers 50A, 50B and drinking valve 31 as necessary, and replaced.

FIG. 8 illustrates a representative circuit board 80 in more detail. Circuit board 80 is affixed to auxiliary clip 60 distal to the terminal end of auxiliary clip 60 such that circuit board 80 cooperates with power outlet 70 through prongs 84 (See FIG. 7). Affixed to circuit board 80 are LEDs 82, which are arranged to be in optical communication with fiber-optic cables 66. Fiber-optic cables 66 can have a polyurethane jacket or other suitable means for insulating or containing the cables. For example, a 1 mm diameter fiber-optic cable 66 can be encased in a 2.3 mm diameter jacket. Fiber-optic cable bundles also can be used. Fiber-optic cables 66 may be attached directly to the circuit board 80 or attached via plastic, stainless steel, or other suitable connectors (not shown). Fiber-optic cables 66 may be arranged in a continuous circle, and in an exemplary embodiment arranged in a 16-point optical circle using 16-strand optical fiber. Each fiber-optic cable 66 cooperates with an optic (LED 82) at one end and is connected to light ring 64 at the other end. Light L scatters from the tip of the fiber-optic cables 66 to illuminate the drinking valve 31 about its circumference. The ends of fiber-optic cables 66 can be aimed or otherwise directed to shine on drinking valve 31. An exemplary light ring 64 has opening 68 to accommodate the shroud 12 of the drinking valve 31 mechanism with light ports 65 about the circumference to accommodate the terminal ends of individual fiber-optic cables 66.

FIG. 9 is a side view of a preferred embodiment of the present invention, illustrating a fiber-optic light path. Auxiliary clip 60 attaches to water supply pipe 20. Light ring 64 containing terminal ends of fiber-optic cables 66 is fitted about drinking valve 31. Emitted light L from the fiber-optic cables 66 illuminates drinking valve 31.

FIGS. 10 through 13 illustrate another embodiment of an auxiliary clip 162 used to illuminate the watering stations 30. The embodiment disclosed in FIGS. 10 through 13 includes a hanger 150 and the auxiliary clip 162 (FIG. 13). FIGS. 10A through 10B illustrate the auxiliary clip 162, FIGS. 11A through 11C illustrate the internal circuitry of the auxiliary clip 162, and FIGS. 12 and 13 illustrate the connection of the auxiliary clip 162 to the hanger 150 and to the watering station 30 of the drinking system 10.

Turning to FIGS. 12 and 13, the hanger 150 comprises a cylindrical body 154 with a hanger hook 152, a right lower projection 156, and a left lower projection 157. A conduit 140 occupies the space within the cylindrical body 154 of the hanger 150. The hanger hook 152 is used to attach the hanger 150 by means of a wire or other suitable fastener to the structure of the farm facility. The lower right projection 156 terminates in a right wire channel 170 extending along the length of the hanger 150. A right embedded wire 172 extends along the length of the right wire channel 170. Likewise, the lower left projection 157 terminates in a left wire channel 171 extending along the length of the hanger 150. A left embedded wire 173 extends along the length of the left wire channel 171. As will be described in greater detail below, the hanger 150 supports the auxiliary clip 162, which in turn supports the water supply pipe 20 and its associated watering stations 30.

With reference to FIGS. 10A through 10D, the auxiliary clip 162 comprises a central light ring 164, a right arm 120, and a left arm 121. The central light ring 164 has a central opening 168. The right arm 120 is connected to the central light ring 164 by means of a flexible right hinge 122. Similarly, the left arm 121 is connected to the central light ring 164 by means of a flexible left hinge 123. The flexible hinges 122 and 123 allowed the arms 120 and 121 to be folded into the U-shaped configuration shown in FIG. 12. As shown in FIG. 10D, the central light ring 164 has fiber-optic cables 166 that terminate around the periphery of the central opening 168. Internal circuitry 128 (FIGS. 11A through 11C) is embedded in the central light ring 164 and the arms 120 and 121 of the auxiliary clip 162.

With reference to FIGS. 11A through 11C, the internal circuitry 128 comprises a flexible ribbon having a central portion 136, a right flexible ribbon 130, and a left flexible ribbon 131. The central portion 136 has a central opening 137 that matches the central opening 168 of the light ring 164. The internal circuitry 128 further comprises a right connector 180 and a left connector 181 at opposite ends of the right flexible ribbon 130 and the left flexible ribbon 131 respectively. An LED connector circuit 134 interconnects LEDs 182 spaced around the central opening 137. The LED connector circuit 134 is connected to the right connector 180 and the left connector 181 by printed circuit leads 132 and 133 respectively.

The internal circuitry 128 is embedded within the auxiliary clip 162 so that the central opening 137 of the internal circuit 128 matches the central opening 168 of the central light ring 164. Similarly, the right flexible ribbon 130 extends within the right arm 120 of the auxiliary clip 162, and the left flexible ribbon 131 extends within the left arm 121 of the auxiliary clip 162. The first ends of the fiber-optic cables 166 are optically connected to the LEDs 182, and the other ends of the fiber-optic cables terminate around the periphery of the central opening 168 of the central light ring 164 once the internal circuitry 128 is embedded within the auxiliary clip 162.

The auxiliary clip 162 may be formed of any suitable flexible material that may be formed into the U-shaped configuration shown in FIG. 12. The auxiliary clip 162 may be advantageously formed of plastic material with the flexible hinges 122 and 123 as is commonly known in the art. Such plastic construction, in addition, allows for the molding of the auxiliary clip 162 in two parts so that the internal circuitry 128 may be embedded within the auxiliary clip 162.

Turning again to FIGS. 12 and 13, the auxiliary clip 162 is attached to the hanger 150 by inserting the right connector 180 of the auxiliary clip 162 into the right wire channel 170 of the hanger 150 and by inserting the left connector 181 of the auxiliary clip 162 into the left wire channel 171 of the hanger 150. When the left and right connectors 180 and 181 are inserted into the left and right wire channels 170 and 171, the connectors 180 and 181 engage the embedded wires 172 and 173 respectively so that the embedded wires 172 and 173 can provide electric current to power the LEDs 182. By engaging the wire channels 170 and 171, the connectors 180 and 181 also provide mechanical support for the water supply pipe 20 and its associated watering stations 30.

With respect to all of the embodiments of the invention disclosed above, it is also possible to include a timer (not shown) to regulate when the light source 40 emanates light. In this arrangement, the drinking system 10 may be set to engage and to provide water at specific times or to draw animals to the watering stations 30 at specific times. For example, the timer can turn on both the water and the light source 40, or just the light source 40 assuming the water flow is always on, at set times and/or for set time periods. Timers suitable with this invention 10 include known programmable timers. The timer can be operatively connected to shutoff valves typically associated with common drinking systems.

Alternatively, drinking system 10 can have a switch that allows the light source 40 to be operated by the flow of water. In this arrangement, the switch can be a valve that allows the light source 40 to be turned on and off in accordance with the water flow. For example, the valve can be connected to a switch so that the flow of water displaces the valve, which thereby triggers the light sources 40. The switch can be operatively connected to shutoff valves typically associated with common drinking systems.

As can been seen, light source 40 of the present invention may be any suitable light source 40 that produces electromagnetic radiation. For example, such light sources 40 can include light output transducers such as low voltage incandescent lamps and light-emitting diodes (LEDs), series-connected or in parallel in the respective circuit. In some cases, it may be suitable to select an ultraviolet light as this type of light is a known disinfectant. Other suitable light sources include fluorescent, noble gas and laser light sources.

It is also contemplated that the watering stations 30 can be modular. Watering stations 30 can be fitted in an exchangeable manner and can be replaced individually with another component, with different features or otherwise, without it being necessary to shut off the water supply 22, and thus put the system 10 out of operation. Suitable watering stations 30 for use with this invention are known in the art. For example, one such watering station 30 includes the drinking valve disclosed in U.S. Pat. No. 6,308,657. The structure of watering nipples has been disclosed, for example, in the U.S. Pat. Nos. 2,457,159, 2,486,729, 3,322,101, 3,418,977, 4,416,221, 4,984,537, 5,193,485, and 6,058,881. In some instances, it may be necessary to modify the material of the relevant parts so that light can pass therethrough. One of ordinary skill in the art may select a suitable watering station 30 without undue experimentation.

The dimensions of drinking system 10 can depend on size of animal raised in the farm facility in which drinking system 10 is being employed. For example, in a large animal farm facility, it may be appropriate to have a larger drinking system 10 than in a smaller farm facility. A part of drinking system 10 can be designed to be outside farm facility. The drinking system 10 in some embodiments may be larger (longer) than in other farm facilities. One of ordinary skill in the art can select the dimensions of drinking system 10 for a specific farm facility without undue experimentation.

The numbers of drinking systems 10 or watering stations 30 as shown and described herein are for illustrative purposes. The actual number of drinking systems 10 or watering stations 30 used with the present invention can be substantially varied and will depend on numerous factors including the size of the farm facility, the dimensions of drinking system 10 or watering stations 30 and the desired spacing between such items, and animals. One of ordinary skill in the art can select the number of drinking systems 10 or watering stations 30 to be used with drinking systems 10 without undue experimentation.

Another embodiment of this invention includes a method for selectively distributing water to animals within a farm facility comprising the steps of:

a) providing at least one drinking station capable of being illuminated by a light source;

b) activating the light source so as to modify the behavior of the animals within an animal farm facility, whereby the activation of the light source causes at least a portion of the drinking station to illuminate. The method can provide animal caretakers with more control over the drinking habits of their animals.

By influencing the drinking behavior of animals, one can positively affect the health and growth rate of the animals. For example, better-hydrated animals can be healthier and grow more quickly than poorer hydrated animals. In animal raising facilities, including food animal raising facilities, it generally is preferable to raise healthier animals more quickly so as to maximize the use of the facility, maximize the animal crop, and/or maximize the value of the animal. Thus, it also is an aspect of this invention to use the inventive system to increase the health and growth rate of the animals, to increase the size and value of the animal crop, and to increase the value of the facility by making the facility more efficient in the raising of the animals.

Additionally, by being able to illuminate the watering stations 30 at desired times and for desired lengths of time, it may be possible to attract the animals to drink at specific times and for specific lengths of time. This can be used in the administration of vitamins, medicines and/or other supplements through the drinking system 10. For example, if it is desirable to administer a supplement via the drinking system 10, the supplement can be added to the water, the light source 40 activated, thereby illuminating the drinking valves 31 and causing the animals to drink the supplemented water. Further, by varying the color of the light source 40, it may be possible to attract only a certain desired type of animal to the drinking valves 31 for a specific type of supplement (or merely to drink more), while the undesired types of animals may not be attracted to the drinking valves 31 due to the color of the light.

The method of the present invention can be illustrated by referring back to FIG. 1 and FIG. 5, which also show drinking system 10 in operation and use. It is contemplated that drinking system 10 may be used with a typical animal raising farm facility. For example, an exemplary animal raising farm facility can have multiple drinking lines, each hundreds of feet long and each having hundreds of watering stations 30 installed thereon. As individual animals are drawn to drinking stations 30 by the light emanating therefrom, the actuation of the light source 40 can be used to influence the water drinking patterns of animals. For example, light source 40 can be in light mode for a longer period to encourage animals to drink more or longer from watering stations 30. Alternatively, the light source 40 can be turned off or in a dark mode or to another color of light to discourage the animal from drinking water and animals will generally migrate away from watering stations 30. Thus, it is possible to influence the water drinking patterns of animals so to optimize the efficiency of the farm facility.

It is also contemplated that the animals can use the drinking system 10 in manner similar to any other drinking system. For example, once at the watering stations 30, the animals peck or nudge against the exposed end of actuator stem 17 (see FIG. 4 for an illustrative structure for watering valve 31) causing the actuator stem 17 to be angularly displaced in a rocking relation from its closed relation relative to valve pin 19 (FIG. 4) that is caused to be displaced upwardly. The extent of displacement will be generally correlated to the level of force imposed such that the smaller chicks will effect lesser displacement than will the larger more mature birds, resulting in less water being supplied to smaller birds. This is known in the art.

The above detailed description of the preferred embodiments, examples, and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. An animal drinking system for influencing water drinking patterns of animals, the system comprising:
   a) a water source for delivering drinking water through water supply pipes;
   b) watering stations fluidly connected to said water supply pipes, the watering stations each comprising a drinking valve;
   c) at least one light source optically connected to a first end of a plurality of fiber-optic cables, wherein a second end of said plurality of fiber-optic cables terminates proximal to the drinking valve and emits light so as to illuminate the drinking valve;
   d) a means for selectively activating and deactivating the at least one light source; and
   e) hangers connected to said water supply pipes such that said water supply pipes are suspended from said hangers,
   whereby activating the light source so as to illuminate the drinking valve at desired times and for desired lengths of time influences the drinking behavior of animals by drawing the animals to the watering stations to encourage the animals into drinking water, and
   whereby deactivating the light source so that the drinking valve is unilluminated at desired times and for desired lengths of time influences the drinking behavior of animals by discouraging the animals from drinking water, thereby influencing the water drinking patterns of the animals.

2. The system as claimed in claim 1, further comprising an auxiliary clip, wherein said auxiliary clip is detachably connected to said water pipes at a first end and one of said watering stations at a second end, and wherein said fiber-optic cables are housed within said auxiliary clip.

3. The system as claimed in claim 2, wherein the auxiliary clip is detachably connected to the hanger by a hinge system.

4. The system as claimed in claim 1, further comprising a timer.

5. The system as claimed in claim 1, wherein the at least one light source is supplied by at least one LED.

6. The system as claimed in claim 5, further comprising a circuit board connected to said auxiliary clip, said circuit board containing said at least one LED, such that the circuit board is in communication with an electrical outlet when said auxiliary clip is attached to said water supply pipes, whereby said at least one LED is capable of being energized.

7. The system as claimed in claim 1, further comprising electrical wiring, wherein said electrical wiring extends adjacent to said water supply pipes.

8. The system as claimed in claim 1, wherein the light illuminates an actuator stem of the drinking valve of at least one of the watering stations.

9. An animal drinking system comprising:
   a) a water source capable of delivering water through water supply pipes;
   b) watering stations fluidly connected to said water supply pipes;
   c) an auxiliary clip, wherein said auxiliary clip is detachably connected to said water pipes at a first end and said watering station at a second end, and wherein said fiber-optic cables are housed within said auxiliary clip;
   d) at least one light source optically connected to a first end of a plurality of fiber-optic cables, wherein a second end of said plurality of fiber-optic cables is capable of emitting light and illuminating at least one of the watering stations; and
   e) a light ring connected at the top to said second end of the auxiliary clip, wherein a terminal end of said plurality of fiber-optic cables are visible at the bottom of said light ring, whereby said plurality of fiber-optic cables emit light when the at least one light source is activated.

* * * * *